US010063300B2

(12) United States Patent
Pham et al.

(10) Patent No.: US 10,063,300 B2
(45) Date of Patent: Aug. 28, 2018

(54) COMPUTING PMIS, PARTICULARLY IN WIRELESS COMMUNICATIONS SYSTEMS HAVING THREE-DIMENSIONAL COMMUNICATIONS CHANNELS, USING A REFERENCE ANTENNA OR A REFERENCE ANTENNA SUBSET

(71) Applicant: NEC Corporation, Minato-ku, Tokyo (JP)

(72) Inventors: Duong Pham, Mulgrave (AU); Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/312,019

(22) PCT Filed: Mar. 19, 2015

(86) PCT No.: PCT/JP2015/059283
§ 371 (c)(1),
(2) Date: Nov. 17, 2016

(87) PCT Pub. No.: WO2015/194229
PCT Pub. Date: Dec. 23, 2015

(65) Prior Publication Data
US 2017/0093473 A1 Mar. 30, 2017

(30) Foreign Application Priority Data

Jun. 16, 2014 (AU) ................................ 2014902277

(51) Int. Cl.
*H04B 7/06* (2006.01)
*H04B 7/0456* (2017.01)
*H04B 7/0452* (2017.01)

(52) U.S. Cl.
CPC ......... *H04B 7/0478* (2013.01); *H04B 7/0452* (2013.01); *H04B 7/0626* (2013.01); *H04B 7/0632* (2013.01)

(58) Field of Classification Search
CPC . H01Q 1/24; H01Q 1/244; H01Q 3/26; H04B 1/02; H04B 7/00; H04B 7/02;
(Continued)

(56) References Cited

U.S. PATENT DOCUMENTS

2007/0281746 A1    12/2007   Takano et al.
2010/0215114 A1*    8/2010   Kim ..................... H04B 7/0413
                                                                                            375/267

(Continued)

FOREIGN PATENT DOCUMENTS

WO    2013/024351 A1    2/2013
WO    2013/157790 A1    10/2013

OTHER PUBLICATIONS

International Search Report for PCT Application No. PCT/JP2015/059283, dated Jun. 16, 2015.

(Continued)

*Primary Examiner* — Shawkat M Ali

(57) ABSTRACT

A system includes an eNB which is operable to communicate with one or UEs and a set of multiple transmit antennas associated with the eNB. The antennas are partitioned into multiple antenna subsets. In a first form of the method, one of the antennas is designated as a reference antenna and the reference antenna forms part of each antenna subset. In a second form of the method, one of the subsets is designated as a reference subset. The UE(s) are operable to compute multiple PMIs for the respective multiple subsets and to report the multiple PMIs to the eNB for the eNB to use in precoding. The first form involves computing a PMI for a given antenna subset independently of the PMIs of any of the other antenna subsets. The second form involves com- (Continued)

puting a PMI for a given subset based on or using the PMI for the reference subset.

13 Claims, 8 Drawing Sheets

(58) Field of Classification Search
CPC ... H04B 7/04; H04B 7/06; H04B 7/08; H04B 7/0478; H04B 7/0452; H04B 7/0632; H04B 7/0626; H04B 7/0897; H04B 7/0486; H04B 7/0417; H04B 7/0482; H04B 17/00; H04L 5/00; H04L 12/26; H04W 16/28; H04W 24/00; H04W 40/00; H04W 72/04; H04W 88/02
USPC ........ 370/252, 312, 328, 329, 334; 375/219, 375/267, 295, 316, 349; 455/67.11, 101, 455/513, 562.1
See application file for complete search history.

(56) References Cited

U.S. PATENT DOCUMENTS

| | | | | |
|---|---|---|---|---|
| 2011/0032839 | A1* | 2/2011 | Chen | H04B 7/024 370/252 |
| 2011/0200131 | A1* | 8/2011 | Gao | H04B 7/0452 375/267 |
| 2012/0087265 | A1 | 4/2012 | Tamaki et al. | |
| 2013/0287139 | A1* | 10/2013 | Zhu | H04N 21/2365 375/295 |
| 2013/0343328 | A1* | 12/2013 | Nilsson | H04B 7/0434 370/329 |
| 2014/0112406 | A1* | 4/2014 | Zhu | H04B 7/0452 375/267 |
| 2015/0092875 | A1 | 4/2015 | Kim et al. | |
| 2015/0180557 | A1* | 6/2015 | Kim | H04B 7/0456 375/267 |
| 2016/0021551 | A1* | 1/2016 | Park | H04B 7/0619 370/328 |
| 2016/0226570 | A1* | 8/2016 | Nicholls | H01Q 1/246 |

OTHER PUBLICATIONS

Written Opinion of the International Search Authority for PCT Application No. PCT/JP2015/059283.
Extended European Search Report for EP Application No. EP15809087.8 dated Jan. 19, 2018.

* cited by examiner

Pattern(3)

Pattern(2)

Pattern(1)

Pattern(1)  Pattern(2)

US 10,063,300 B2

COMPUTING PMIS, PARTICULARLY IN WIRELESS COMMUNICATIONS SYSTEMS HAVING THREE-DIMENSIONAL COMMUNICATIONS CHANNELS, USING A REFERENCE ANTENNA OR A REFERENCE ANTENNA SUBSET

This application is a National Stage Entry of PCT/JP2015/059283 filed on Mar. 19, 2015, which claims priority from Australian Patent Application 2014902277 filed on Jun. 16, 2014, the contents of all of which are incorporated herein by reference, in their entirety.

TECHNICAL FIELD

The present invention relates to the computation of precoder matrix indicators (PMIs) in communication systems in which an evolved Node B partitions a set of multiple transmit antennas into multiple subsets, and in which UE(s) are configured to report (feed back) multiple PMIs for the multiple transmit antenna subsets.

BACKGROUND ART

Wireless communication systems are widely known in which base stations (also known as evolved Node Bs (eNBs)) communicate with mobile devices (also known as user equipments (UEs)) which are within range of the eNB. Each eNB divides its available bandwidth, i.e. frequency and time resources, into different resource allocations for the different UEs. There is a constant need to increase the capacity of such systems, and to improve the efficiency of resource utilisation, in order to accommodate more users (more UEs), more data-intensive services and/or higher data transmission rates.

OFDM (Orthogonal Frequency Division Multiplexing) is one technique used for transmitting data in wireless communication systems. An OFDM-based communications scheme divides data symbols to be transmitted among a large number of subcarriers; hence the term "frequency division multiplexing". Data is modulated onto a subcarrier by adjusting its phase, amplitude, or both phase and amplitude. The "orthogonal" part of the name OFDM refers to the fact that the spacings of the subcarriers in the frequency domain are chosen so as to be orthogonal, in a mathematical sense, to the other subcarriers. In other words, they are arranged in the frequency domain such that the sidebands of adjacent subcarriers may overlap but such that inter-subcarrier interference is sufficiently minimised for the subcarriers to be received.

When individual subcarriers or sets of subcarriers are assigned to different users (different UEs), the result is a multi-access system referred to as OFDMA (Orthogonal Frequency Division Multiple Access). The term OFDM is often intended to include OFDMA. The two terms may therefore be considered interchangeable for the purposes of the present explanation. By assigning distinct frequency/time resources to each UE in a cell, OFDMA can help to avoid interference among UEs within a given cell.

A further modification of the basic OFDM scheme is called MIMO which stands for "multiple-input multiple-output". This type of scheme employs multiple antennae at the transmitter and/or at the receiver (usually at both) to enhance the data capacity achievable between the transmitter and the receiver. Typically, this is used to achieve enhanced data capacity between an eNB and the user equipment(s) (UE(s)) served by that eNB.

By way of example, a 2×2 "single-user MIMO" (SU-MIMO) configuration contains two antennae at the transmitter and two antennae at a single receiver that is in communication with the transmitter. Likewise, a 4×4 SU-MIMO configuration contains four antennae at the transmitter and four antennae at the single receiver that is in communication with the transmitter. There is no need for the transmitter and receiver to employ the same number of antennae. Typically, an eNB in a wireless communication system will be equipped with more antennae in comparison with a UE, owing to differences in power, cost and size limitations. It should also be noted that so called "multi-user MIMO" (MU-MIMO) is often employed, and this involves a single eNB which is able to perform MIMO communication with multiple UEs at once. This is discussed further below.

The term "channel" is commonly used to refer to the frequency (or equivalently time delay) response of the radio link between a transmitter and a receiver. The MIMO channel (hereafter simply the "channel") contains all the subcarriers (see the discussion on subcarriers above), and covers the whole bandwidth of transmission. A MIMO channel contains many individual radio links. The number of these individual radio links, which may each be individually referred to as a single-input single-output (SISO) channel, is $N_{RX} \times N_{TX}$, where $N_{TX}$ is the number of antennae at the transmitter and $N_{RX}$ is the number of antennae at the receiver(s). For example, a 3×2 SU-MIMO arrangement contains 6 links, hence it has 6 SISO channels.

Considering the simplified 2×3 SU-MIMO system schematically represented in FIG. 1, it can be seen that antenna R0 of receiver R receives transmissions from each of the transmitter antennae T0, T1 and T2 of transmitter T. Similarly, receiver antenna R1 receives transmissions from transmitter antennae T0, T1 and T2. Therefore, the signal received at the receiver comprises (or is made up of) a combination of the transmissions (i.e. a combination of the six SISO channels) from the transmitter antennae. In general, SISO channels can be combined in various ways to transmit one or more data streams to the receiver.

FIG. 2 is a conceptual diagram of a more generalized SU-MIMO system. In FIG. 2, a transmitter transmits signals utilizing $N_{TX}$ transmitting antennae, and a single receiver receives the signals from the transmitter utilizing $N_{RX}$ receiving antennae. In order to create a mathematical model of the characteristics of the overall MIMO channel (in this case a SU-MIMO channel), it is necessary to represent the individual SISO channels between the transmitter and receiver. As shown in FIG. 2, the individual SISO channels are represented by $H_{0,0}$ to $H_{N_{RX-1}, N_{TX-1}}$, and as suggested in the Figure, these form terms of a matrix commonly called the "channel matrix" or "channel response matrix" H. It will be recognised that $H_{0,0}$ represents the channel characteristics (for example, channel frequency response) for transmitting signals from transmitting antenna 0 to receiving antenna 0. Similarly, $H_{N_{RX-1}, N_{TX-1}}$ represents the channel characteristics for transmitting signals from the transmitting antenna $N_{TX-1}$ to the receiving antenna $N_{RX-1}$, and so on.

In FIG. 2, the symbols $x_0$ to $x_{N_{TX-1}}$, which represent the signal elements transmitted using the transmitting antennae 0 to $N_{TX-1}$ respectively, together form a transmitted signal vector $x=(x_0, x_1, \ldots, x_{N_{TX-1}})^T$, where $O^T$ indicates the vector transpose. (In other words, x is the signal transmitted from the transmitter.) Likewise, the received signal elements $y_0$ to $y_{N_{RX-1}}$ received by receiving antennae 0 to $N_{RX-1}$ respectively together form received signal vector $y=(y_0, y_1, \ldots, y_{N_{RX-1}})^T$. (In other words, y is the signal received at the receiver.) The relationship between the vectors y and x for the simplified single user system shown in FIG. 2 may be modelled by the basic SU-MIMO system equation:

$$y=Hx+n \qquad \text{(Equation 0)}$$

where H is the channel matrix referred to above and n is a vector representing noise (usually assumed to be additive white Gaussian noise).

It should be noted at this point that FIG. 1 and FIG. 2 (discussed above) both relate to "single user" MIMO (SU-MIMO) systems. However, as also mentioned above, so called "multi-user" MIMO (MU-MIMO) is often employed, and this involves a single eNB which has multiple antennas and which is able to perform MIMO communication with multiple UEs (each of which may also have multiple antennas) at once. A schematic representation of a MU-MIMO system is given in FIG. 3.

More specifically, FIG. 3 shows a general MU-MIMO system where the eNB transmits data to different UEs on the same time-frequency from multiple transmit antennas. To minimise interference between UEs, the eNB creates transmission beams through precoding.

According to Wikipedia for example, "precoding" is a generalization of "beamforming" and is used to support multi-stream transmission in multi-antenna wireless communications. In conventional single-stream beamforming, the same signal is emitted from each of the transmit antennas with appropriate weighting (phase and gain) such that the signal power is maximized at the receiver. When the receiver has multiple antennas, however, single-stream beamforming cannot simultaneously maximize the signal level at all of the receive antennas. In order to maximize the throughput in multiple receive antenna systems, multi-stream transmission is generally required.

In multi-user MIMO (MU-MIMO), a multi-antenna transmitter communicates simultaneously with multiple receivers (each having one or multiple antennas), as explained above. From an implementation perspective, precoding algorithms for MU-MIMO systems fall into linear and nonlinear precoding types. The capacity achieving algorithms are generally nonlinear, but linear precoding approaches may still achieve reasonable performance with much lower complexity. Linear precoding strategies include, for example, maximum ratio transmission (MRT), zero-forcing (ZF) precoding, and transmit Wiener precoding.

While performance maximization has a clear interpretation in point-to-point SU-MIMO, a multi-user system generally cannot simultaneously maximize the performance for all users. Multi-user systems may therefore be said to involve a multi-objective optimization problem where each objective corresponds to maximization of the capacity of one of the users. One common way of addressing this problem is to select a system utility function; for example, the weighted sum capacity where the weights correspond to the system's subjective user priorities.

In any case, at the receiving side, a UE uses postcoding (decoding) to obtain its data from the received signal.

Those skilled in the art will be appreciated from the discussion above that precoding is often highly dependent on the state of the channel (i.e. it is dependent on the "channel state")—see below.

Mathematically, a MU-MIMO system can be described (modelled) by modifying the simplified single-user MIMO system equation (Equation 0) above as follows:

$$y(i) = H(i)V(i)x(i) + \sum_{k=1,k\neq i}^{N_{UE}} H(i)V(k)x(k) + n(i) \qquad \text{(Equation 1)}$$

In Equation 1:
y(i) is the received signal at the i-th UE,
x(i) is the data signal for the i-th UE,
H(i) is the channel matrix for the i-th UE,
V(i) is the precoder matrix of the i-th UE,
n(i) is the additive white Gaussian noise at the i-th user.

MIMO transmission schemes may be said to be either "non-adaptive" or "adaptive". In the non-adaptive case, the transmitter does not have any knowledge of the condition or properties of the channel. In other words, the transmitter does not have any knowledge of the way a transmitted signal changes as it is transmitted "through the air". This lack of knowledge regarding the "channel state" can limit performance as the transmitter cannot take account of, for example, changes in conditions which cause changes in the state or properties of the channel (which affect how a transmitted signal changes "in the air"). Adaptive schemes rely on the feedback of information (so-called "channel-state information" or CSI) from the receiver to the transmitter (i.e. in the uplink (UL)), which allows modification of transmitted downlink (DL) signals to account for changing conditions (i.e. to account for the changing channel state) and to maximise data throughput. In other words, the feedback of CSI can be used to facilitate or assist with precoding. The present invention is concerned primarily with these adaptive types of MIMO schemes. The feedback of CSI in the uplink, from different UEs, is illustrated in FIG. 4.

The following table contains certain abbreviations/acronyms that may be found herein:

| | |
|---|---|
| CSI | channel state information (includes PMI, RI and CQI) |
| CQI | channel quality indicator |
| DL | downlink |
| eNB | evolved Node B (base station) |
| MIMO | multiple-input multiple-output |
| MU-MIMO | multi-user MIMO |
| OFDM | orthogonal frequency division multiplexing |
| OFDMA | orthogonal frequency division multiple access |
| PMI | precoder matrix indicator |
| RI | rank indicator |
| SISO | single-input single-output |
| SU-MIMO | single user MIMO |
| TxAn | transmit antenna |
| UE | user equipment |
| UL | uplink |

It is to be clearly understood that mere reference herein to previous or existing devices, apparatus, products, systems, methods, practices, publications or to any other information, or to any problems or issues, does not constitute an acknowledgement or admission that any of those things, whether individually or in any combination, formed part of the common general knowledge of those skilled in the field, or that they are admissible prior art.

SUMMARY OF INVENTION

In a first broad form, the present invention relates to a method for computing precoder matrix indicators (PMIs) in a wireless communication system, the wireless communication system including a base station (eNB) which is operable to communicate with one or more user equipments (UEs) and a set of multiple transmit antennas associated with the eNB that are partitioned into multiple transmit antenna subsets with one of the subsets designated as a reference subset, wherein the UE(s) are operable to compute multiple PMIs for the respective multiple subsets and to report the multiple PMIs to the eNB for the eNB to use in precoding, the method comprising computing a PMI for a given subset based on or using the PMI for the reference subset.

The wireless communication system in which embodiments of the first form of the invention are implemented may be a multiple-input multiple-output (MIMO) system. As described above, in MIMO systems, the multiple transmit antennas associated with the eNB are operable to transmit signals which can be received by multiple receiver antennas associated with a UE. Embodiments of the first form of the invention may also be suitable for implementation in multi-user MIMO (MU-MIMO) system wherein the multiple transmit antennas associated with the eNB are operable to transmit signals to a plurality of UEs, each of which has multiple receiver antennas, at once.

For embodiments of the first form of the invention, it is envisaged that, at least in most cases, UE(s) will be operable to report the multiple PMIs to the eNB in the uplink. When this is the case, the computing by a UE of a PMI for a given subset based on or using the PMI for the reference subset may involve computing the said given PMI, which is to be reported to the eNB in a given uplink transmission, based on or using the PMI for the reference subset which is also to be reported to the eNB in the same uplink transmission. In other words, the PMIs computed by the UE (for the respective transmit antenna subsets) may be based on the PMI for the reference subset which is to be reported by the UE to the eNB in the same uplink transmission (and not on, say, the PMI of the reference subset that was reported in a previous uplink transmission). In this way, the UE may report PMIs corresponding to the current (or most recent) state of the channel, thereby providing the most up-to-date information regarding the state of the channel to the eNB to use in precoding.

Following on from the above, it will be appreciated that the PMIs reported by a UE to the eNB will generally form part of the channel state information (CSI) reported to the eNB by the UE in the uplink. In this regard, it should be noted that the CSI will also typically include, in addition to the PMIs, a rank indicator (RI) and channel quality indicator (CQI).

In many embodiments of the first form of the invention, the set of multiple transmit antennas associated with the eNB may comprise a two-dimensional (2D) array of transmit antennas. In such embodiments, partitioning the array of transmit antennas may involve grouping individual antennas together to form multiple groups of antennas such that each group forms a transmit antenna subset and no subset has any antennas in common. Typically, the partitioning will be predefined for different transmit antenna array configurations. There may also be more than one possible partition arrangement (pattern) for a given antenna array configuration, and if so, which of the possible partition arrangements (patterns) is used may be configured by the eNB.

As explained in the Background section above, the channel H is the frequency response of the radio link between the transmit antennas associated with the eNB and the receiver antenna(s) associated with the UE(s). Partitioning the array of transmit antennas into N transmit antenna subsets may cause partitioning of the channel into N subchannels. In this context, $H_n$ refers to the channel estimate of the n-th antenna subset. Also, the subchannels may be of size $N_{RX} \times \mu_{TX}$, where $N_{RX}$ is the number of receiver antennas associated with the UE(s), $N_{TX}$ is the number of transmit antennas associated with the eNB, and $N\mu_{TX} = N_{TX}$.

In certain particular embodiments of the first form of the invention, the method for computing PMIs may involve:
A) Computing the PMI $p_1$ of the reference subset (n=1);
B) Performing the following for each of (the non-reference) antenna subsets n=2, ..., N:
 (i) Generating a composite channel matrix $G_n$;
 (ii) Generating composite precoder candidates $v_p$; and
 (iii) Finding the PMI $p_n$.

In embodiments of the first form of the invention involving the particular algorithm set out above, step A) computing the PMI $p_1$ of the reference subset (n=1), may be performed according to $$p_1 = \underset{p \in \{1,\ldots,N_p\}}{\operatorname{argmax}} \{tr([H_1 V_p]^H [H_1 V_p])\}$$

Also, in embodiments of the first form of the invention involving the particular algorithm set out above, step B) (i) generating the composite channel matrix $G_n$, may be performed according to $$G_n = [H_1 H_n]$$

In addition, in embodiments of the first form of the invention involving the particular algorithm set out above, step B) (ii) generating composite precoder candidates $V_p$ may be performed according to $$V_p = \begin{bmatrix} W_{p_1} \\ W_p \end{bmatrix},$$

$$p = 1, \ldots, N_P$$

Furthermore, in embodiments of the first form of the invention involving the particular algorithm set out above, step B) (iii) finding the PMI $p_n$, may be performed according to $$p_n = \underset{p \in \{1,\ldots,N_p\}}{\operatorname{argmax}} \{tr([G_n V_p]^H [G_n V_p])\}$$

In a second broad form, the present invention relates to a method for computing precoder matrix indicators (PMIs) in a wireless communication system, the wireless communication system including a base station (eNB) which is operable to communicate with one or more user equipments (UEs) and a set of multiple transmit antennas associated with the eNB that are partitioned into multiple antenna subsets with one of the antennas designated as a reference antenna and the reference antenna forming part of each antenna subset, wherein the UE(s) are operable to compute multiple PMIs for the respective multiple antenna subsets and to report the multiple PMIs to the eNB for the eNB to use in precoding, the method comprising computing a PMI for a given antenna subset independently of the PMIs of any of the other antenna subsets.

As for the first form of the invention above, the wireless communication system in which embodiments of the second form of the invention are implemented may be a multiple-input multiple-output (MIMO) system in which the multiple transmit antennas associated with the eNB are operable to transmit signals which can be received by multiple receiver antennas associated with a UE. And similar again to the first form of the invention above, embodiments of the second form of the invention may be suitable for implementation in multi-user MIMO (MU-MIMO) system wherein the multiple transmit antennas associated with the eNB are operable to transmit signals to a plurality of UEs, each of which has multiple receiver antennas, at once.

For embodiments of the first form of the invention, it is envisaged that, at least in most cases, UE(s) will be operable to report the multiple PMIs to the eNB in the uplink. Each uplink transmission from the UE(s) to the eNB may also include computed PMIs corresponding to each one of the multiple antenna subsets.

As explained above, the PMIs reported by a UE to the eNB will generally form part of the channel state information (CSI) reported to the eNB by the UE in the uplink, and the CSI will also typically include, in addition to the PMIs, a rank indicator (RI) and channel quality indicator (CQI).

As for the first form of the invention above, in embodiments of the second form of the invention, the set of multiple transmit antennas associated with the eNB may comprises a two-dimensional (2D) array of transmit antennas. However, in the case of embodiments of the second form of the invention, partitioning the array of transmit antennas may involve grouping individual antennas together to form multiple groups of antennas such that each group forms a transmit antenna subset and the reference antenna is one of the antennas in each subset. The partitioning may be pre-defined for different transmit antenna array configurations. There may also be more than one possible partition arrangement (pattern) for a given antenna array configuration, and if so, which of the possible partition arrangements (patterns) is used may be configured by the eNB.

Any of the features described herein can be combined in any combination with any one or more of the other features described herein within the scope of the invention.

BRIEF DESCRIPTION OF DRAWINGS

Preferred features, embodiments and variations of the invention may be discerned from the following Description of Embodiments which provides sufficient information for those skilled in the art to perform the invention. The Description of Embodiments is not to be regarded as limiting the scope of the preceding Summary of the Invention in any way. The Description of Embodiments will make reference to a number of drawings as follows.

DESCRIPTION OF EMBODIMENTS

Figure 1:
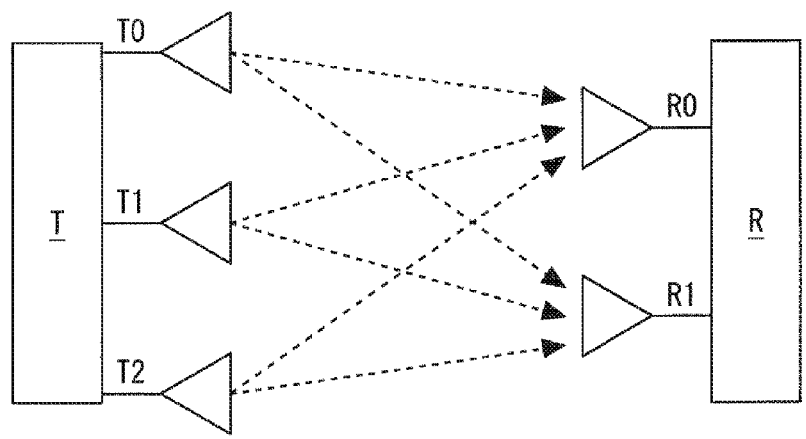
FIG. 1 schematically illustrates a simplified 2×3 SU-MIMO system.
Figure 2:
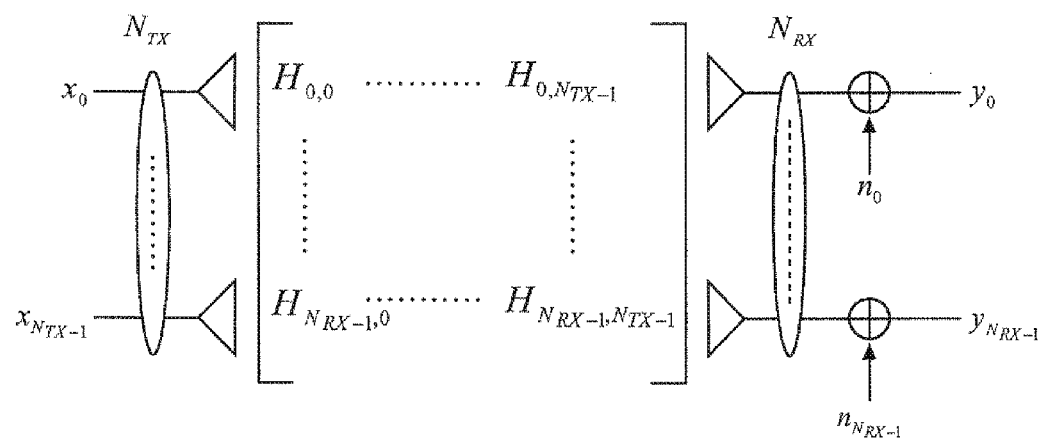
FIG. 2 is a conceptual diagram of a more generalized SU-MIMO system.
Figure 3:
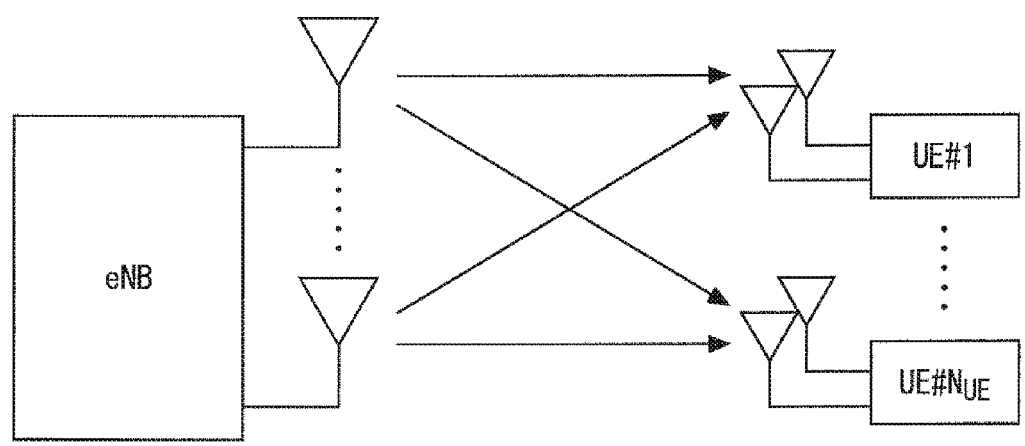
FIG. 3 shows a general MU-MIMO system where the eNB transmits data to different UEs on the same time-frequency from multiple transmit antennas, and each UE also has multiple antennas.
Figure 4:
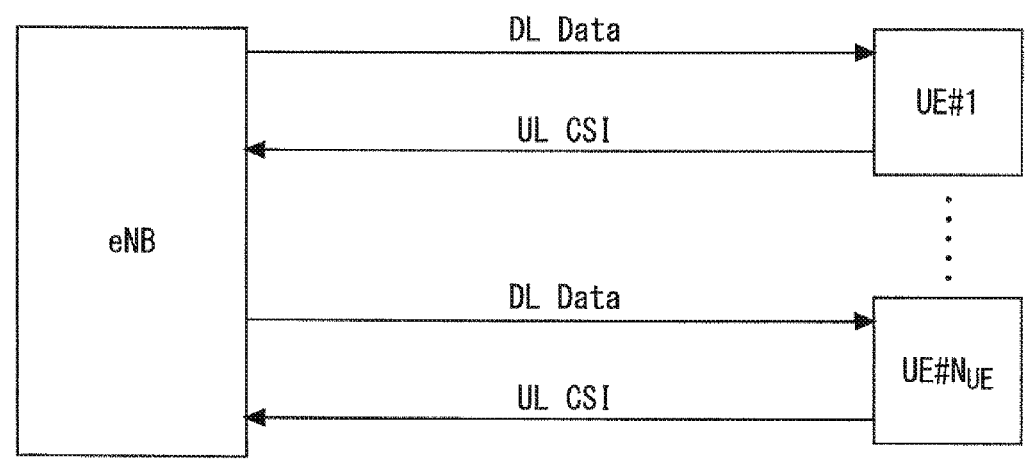
FIG. 4 illustrates the transmission of data in the downlink from the eNB to the different UEs, and also the feedback of CSI to the eNB from the different UEs in the uplink.
Figure 5:
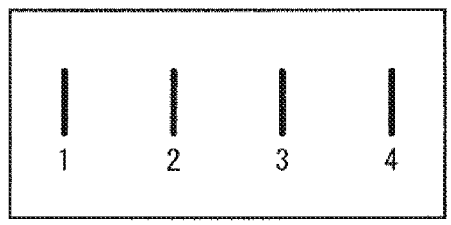
FIG. 5 schematically illustrates a 1-dimensional (1D) array of transmit antennas (i.e. a 1-dimensional antenna set).
Figure 6:
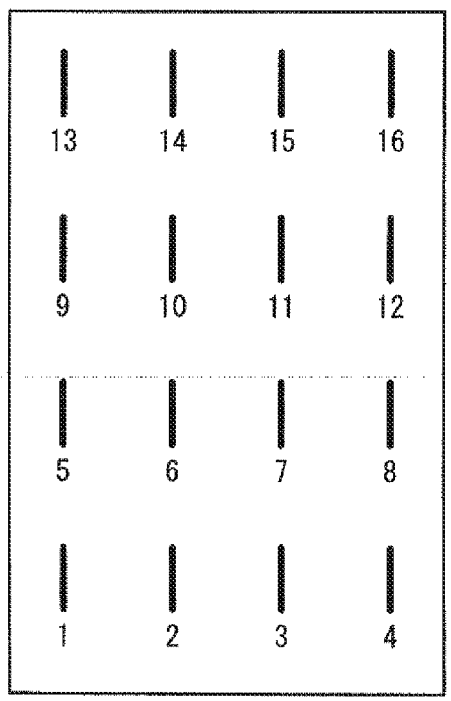
FIG. 6 schematically illustrates a 2-dimensional (2D) array of transmit antennas (i.e. a 2-dimensional antenna set).

In MIMO systems, the eNB can be equipped with a 1-dimensional (1D) array of transmit antennas (see FIG. 5 as an example) or with a 2-dimensional (2D) array of transmit antennas (see FIG. 6 as an example). In the case of a 2D transmit antenna array, the communication channel becomes 3-dimensional (3D). The dimensions of the channel matrix can also be very large, especially for 2-D transmit antenna arrays (which create 3-D channels), which can lead to significant computational complexity, particularly in relation to computing the precoders as well as computing CSI.

In order to help address these issues (i.e. to help reduce the computational complexity discussed above), the eNB may partition (i.e. divide or group) the antenna set into multiple subsets, and the eNB may configure the (or each) UE to compute and report multiple PMIs. Furthermore, when a UE is configured (by an eNB) to compute and report multiple PMIs, as part of this, an individual antenna, or one of the antenna subsets, may be designated/assigned as a reference (i.e. as a reference antenna, or a reference subset).

Figure 7:
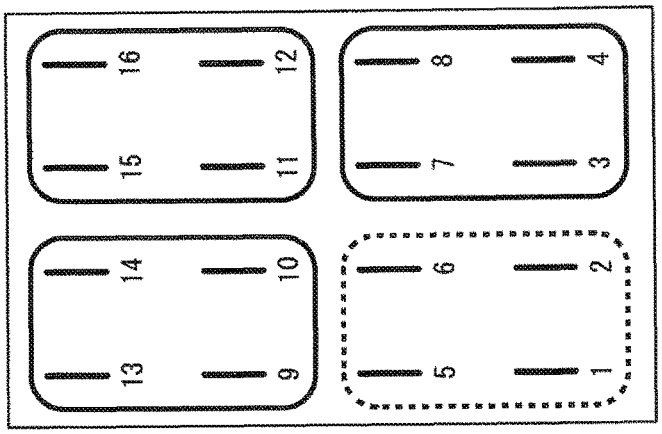
FIG. 7 illustrates various (non-limiting) examples of the way in which a 2-dimensional (2D) array of transmit antennas (i.e. a 2-dimensional antenna set) can be partitioned into multiple antenna subsets with one of the subsets designated as the reference subset.
Figure 7:
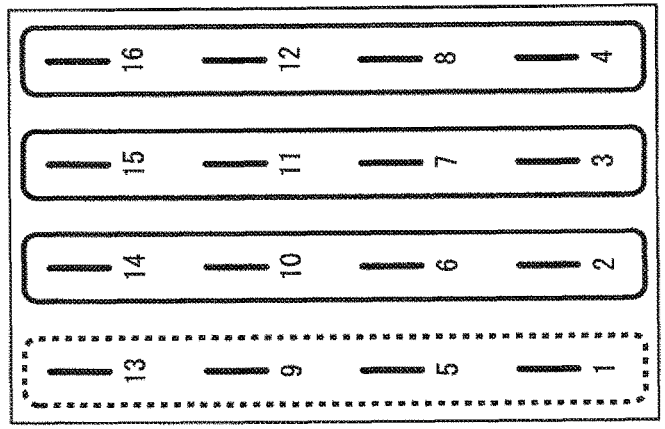
Figure 7:
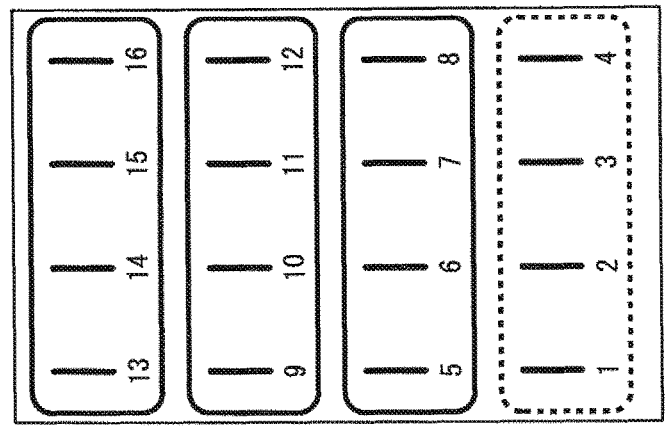

Examples of the way a 2D antenna set can be partitioned into multiple subsets, with one of the said subsets being designated as the reference subset, are given in FIG. 7. Note that, in the different examples in FIG. 7, the particular subset which is designated as the reference subset is, in each case, shown in blue/dashed lines whereas the other (non-reference) subsets in each example are shown in red/unbroken lines. Note also that where the overall antenna array is partitioned into multiple subsets, with one of the subsets being defined as the reference subset, as in the examples in FIG. 7, there are no individual antennas which form part of more than one subset. In other words, none of the antenna subsets have any individual antennas in common.

Figure 8:
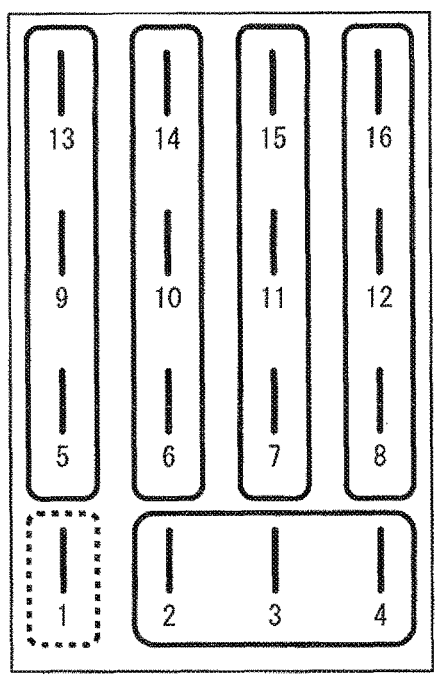
FIG. 8 illustrates various (non-limiting) examples of the way in which a 2-dimensional (2D) array of transmit antennas (i.e. a 2-dimensional antenna set) can be partitioned into multiple antenna subsets with one individual antenna designated as the reference antenna.
Figure 8:
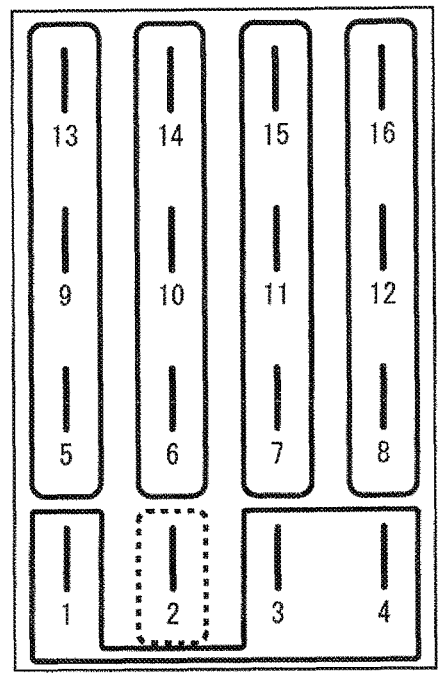

FIG. 8 on the other hand gives examples of the way an antenna set (again a 2-D antenna array) can be partitioned into multiple subsets and with one of the individual antennas of the antenna array being designated as the reference antenna. In FIG. 8, the particular antenna which is designated as the reference antenna in each case is shown in blue/dashed lines. Also, as discussed below, where an antenna array is partitioned into multiple subsets with one of the individual antennas of the array being designated as the reference antenna, the individual reference antenna actually forms part of multiple (or all) of the different antenna subsets.

PMI Computation Method Where an Antenna Subset is Defined as the Reference

Embodiments of the present invention which fall under this heading may involve a PMI computation method which is performed at the UE and intended for use in the case where an evolved Node B partitions the transmit antenna set into multiple subsets, configures UE(s) to measure/compute and report multiple PMIs, and where one of the antenna subsets is assigned as the reference. In these embodiments, the computation by a UE of a PMI for a particular antenna subset may be based on the PMI of the reference subset.

Figure 9:
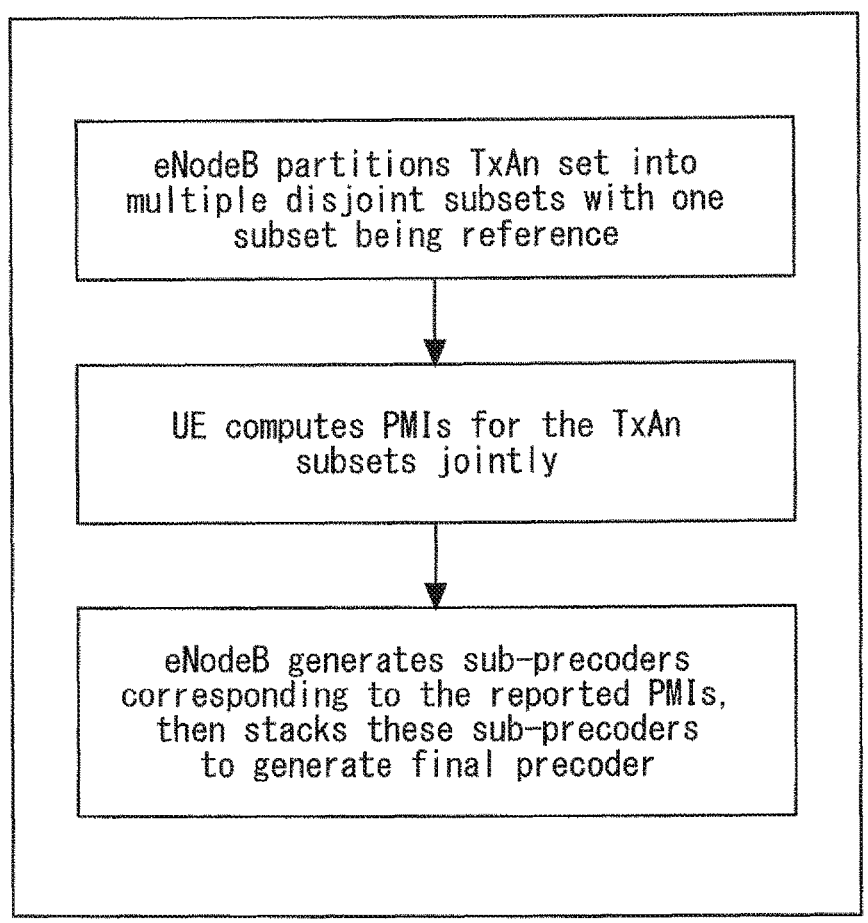
FIG. 9 is a graphical representation of a PMI computation and precoding process for the case where an antenna subset is defined as the reference.
Figure 10:
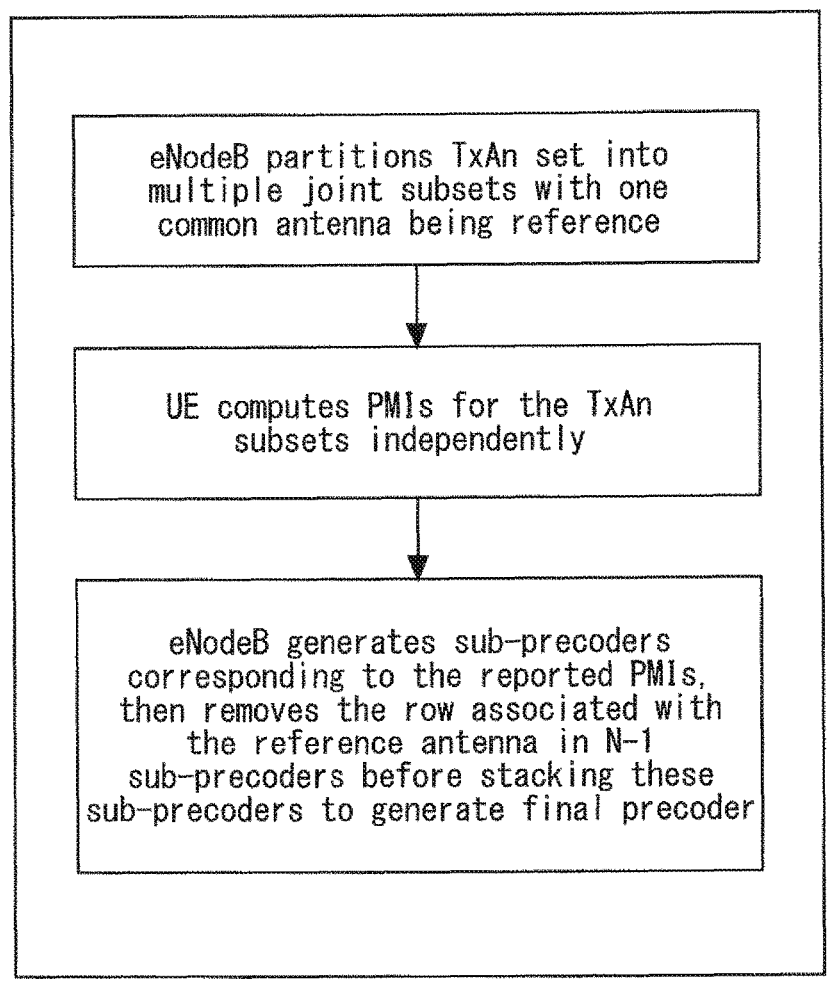
FIG. 10 is a graphical representation of a PMI computation and precoding process for the case where an individual antenna is defined as the reference.

For example, as illustrated in FIG. 9, where an eNB partitions a transmit antenna array into multiple antenna subsets, the eNB may also (as part of this) assign one of the subsets as the reference, and the eNB may configure UEs to report PMIs for each of the defined antenna subsets. Importantly, in these embodiments (where one of the antenna subsets is the reference) the UE computes the PMIs in what might be described as a "joint" manner. More specifically, the computed PMI for an individual antenna subset is dependent on the PMI of the reference subset. One particular method for computing the PMIs for individual antenna subsets based on (or using) the PMI of the reference subset is discussed below. However, it is to be clearly understood that, in these embodiments where the eNB partitions the transmit antenna set into multiple subsets and one of the antenna subsets is assigned as the reference, any suitable method for computing the PMIs for individual antenna subsets based on (or using) the PMI of the reference subset may be used.

In any case, as shown in FIG. 9, the UE computes the PMIs for the various subsets (jointly) and reports these to the eNB (in the uplink), and the eNB then uses these reported PMIs to generate corresponding sub-precoders. After that, the eNB stacks the sub-precoders to generate a final precoder for use in subsequent data transmissions to the UE(s) in the downlink. The means by which the eNB uses the reported PMIs to generate corresponding sub-precoders, and the way the sub-precoders are stacked to generate a final precoder, are not directly relevant to the present invention and therefore will not be explained further.

Partitioning a set of transmit antennas (i.e. partitioning a TxAn set) into subsets causes, as a result of doing so, partitioning of the overall channel (where the overall channel is of size $N_{RX} \times N_{TX}$) into N subchannels of size $N_{RX} \times \mu_{TX}$, where $N\mu_{TX} = N_{TX}$. The partitioning may be predefined for different transmit antenna array configurations. In other words, a given transmit antenna array configuration may be partitioned in a particular predefined manner, and there may be different predefined partition arrangements (patterns) for different antenna array configurations. There may also be more than one possible partition arrangement (pattern) for a given antenna array configuration (the examples in FIG. 7 demonstrate this), and which of these possible partition arrangements (patterns) is used may be configured by the eNB.

Figure 11:
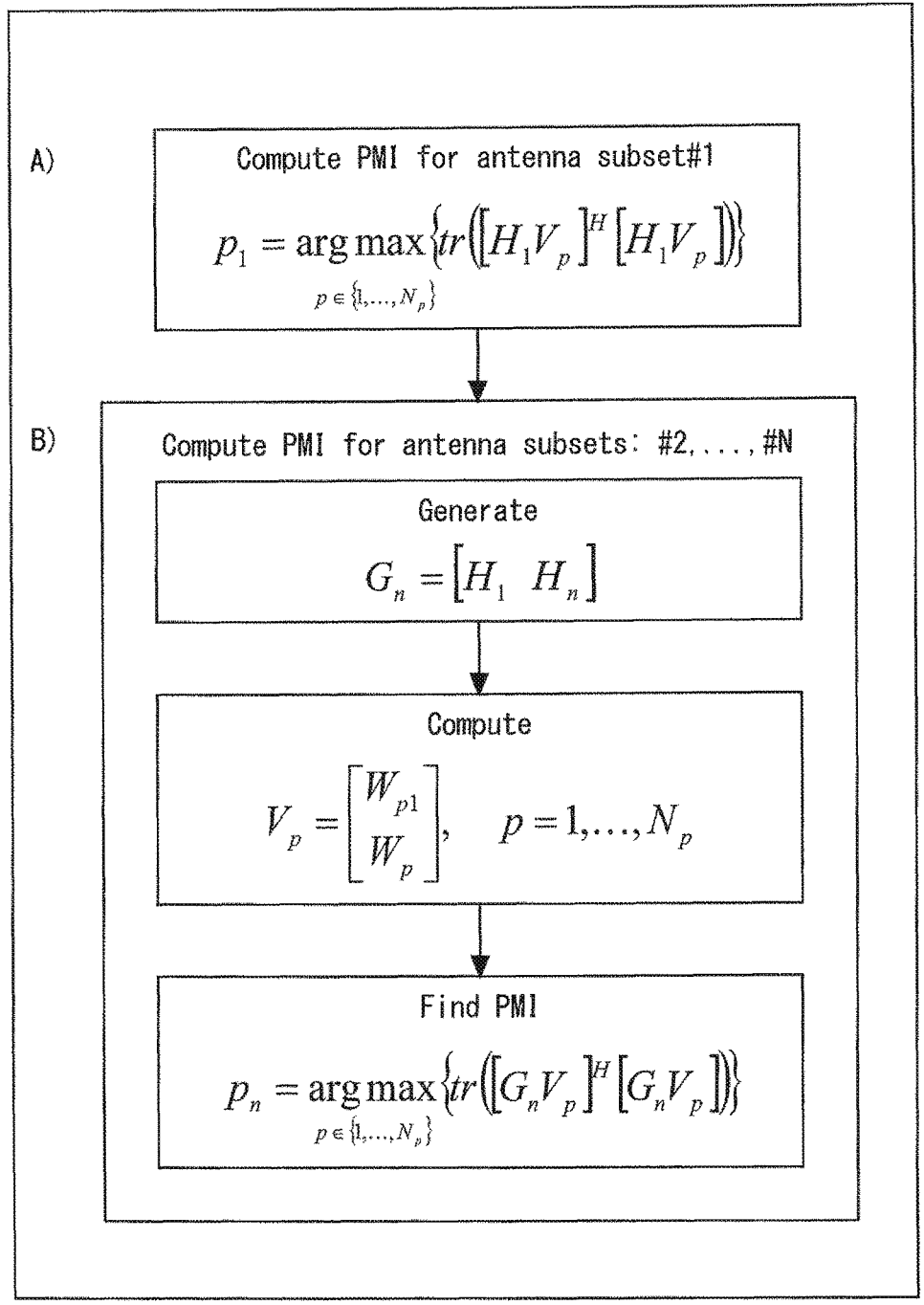
FIG. 11 is a graphical representation of an algorithm for PMI computation according to one particular embodiment of the invention for the case where an antenna subset is defined as the reference.

One particular algorithm that may be used for PMI computation (which is a particular embodiment of the invention applicable to the situation where one of the antenna subsets is defined as the reference) is explained below and depicted in FIG. 11. In the algorithm:

$H_n$, n=1, ..., N of size $N_{RX} \times \mu_{TX}$ denotes the channel estimate of the n-th antenna subset;

$W_p$, p=1, ..., $N_p$, of size $\mu_{TX} \times RI$ denotes the precoder (codeword) of the PMI codebook; and $p_n$, n=1, ..., N denotes the PMI of the n-th antenna subset.

The particular algorithm is as follows:

A) Compute the PMI of the antenna subset #1 (namely the reference subset) using $$p_1 = \underset{p \in \{1,\ldots,N_p\}}{\operatorname{argmax}} \{tr([H_1 V_p]^H [H_1 V_p])\} \qquad \text{(Equation 2)}$$

B) Perform the following for each of (the non-reference) antenna subsets n=2, ..., N:

(i) Generate the composite channel matrix using:

$$G_n = [H_1 H_n] \qquad \text{(Equation 3)}$$

(ii) Generate composite precoder candidates using:

$$V_p = \begin{bmatrix} W_{p_1} \\ W_p \end{bmatrix}, \qquad \text{(Equation 4)}$$

$$p = 1, \ldots, N_P$$

(iii) Find the PMI $p_n$ using:

$$p_n = \underset{p \in \{1,\ldots,N_p\}}{\operatorname{argmax}} \{tr([G_n V_p]^H [G_n V_p])\} \qquad \text{(Equation 5)}$$

C) End.

As has been explained, in embodiments of the present invention which are intended for operation in the case where one of the antenna subsets is defined as the reference, the computation by a UE of a PMI for a particular antenna subset may be performed using (or with reference to) the PMI of the reference subset. One of the benefits that this is thought to achieve arises due to the fact that the different antenna elements of an overall antenna array are thought to exhibit correlation (i.e. the different individual antennas are thought to be correlated). In other methods for PMI computation, PMIs for the different antenna elements of an overall antenna array are computed entirely independently of one another. In contrast to this, in these embodiments of the invention (where one of the antenna subsets is defined as the reference and the computation by a UE of a PMI for a particular antenna subset is based on the PMI of the reference subset) computation of PMIs is thus performed in what might be said to be a "joint" manner (e.g. computation of the PMI for one antenna subset is performed based on the PMI of another subset, namely the reference subset) such that, with these embodiments, the PMIs computed for the different antenna subsets, which are reported back to the eNB, capture the correlation that exists between antenna subsets.

PMI Computation Method Where an Individual Antenna (Rather Than an Antenna Subset) is the Reference Embodiments of the present invention which fall under this heading may be said to involve a PMI computation method which is performed at the UE and intended for use in the case where an eNB partitions the transmit antenna array into multiple so called "joint subsets" and where one individual antenna, which is common to all of the "joint subsets", is defined as the reference. In such cases, the eNB configures UE(s) to measure/compute and report multiple PMIs (i.e. a PMI corresponding to each said "joint subset"), although the computation by a UE of a PMI for a particular joint subset may be performed independently of the PMI(s) of other joint subsets.

By way of further explanation, in these embodiments, the eNB may partition the antenna set (i.e. the antenna array) in such a way that:

there are multiple subsets (presently referred to as "joint subsets"),
there is an individual antenna defined as the reference antenna, and
the reference antenna forms part of each of the "joint subsets".

For instance, referring to example Pattern (1) in FIG. 8, antenna 1 in this example is defined as the reference antenna, and there are a total of five joint subsets. The five joint subsets are {1,2,3,4}, {1,5,9,13}, {1,6,10,14}, {1,7,11,15} and {1,8,12,16}. Thus, in these embodiments, and using Pattern (1) in FIG. 8 as an example, for the purpose of performing PMI computation and feedback, the UE will compute the PMI for each of the above-mentioned joint subsets (with the PMI for each joint subset being computed independently of the PMI of any other joint subset), and the UE will then feed each of the computed PMIs (i.e. the PMI for each of the joint subsets) back to the eNB in the uplink.

Then, at the eNB side, for the purpose of precoding, the eNB will use the received PMIs to first generate sub-precoders. Then the rows associated with the reference antenna of N-1 sub-precoders are removed before the sub-precoders are stacked to generate a final precoder. For example, for the Pattern (1) in FIG. 8, the first row of the precoders corresponding to the subsets {1,5,9,13}, {1,6,10,14} {1,7,11,15}, {1,8,12,16} are removed to have 3 rows only before being stacked to generate the final precoder.

Those skilled in the art will appreciate, from the explanations given above with reference to the joint subset partition Pattern (1) in FIG. 8, how the same general approach might be applied to, say, the joint subset partition Pattern (2) in FIG. 8 or other possible joint partition patterns.

It is thought these embodiments of the invention (which apply where there is an individual antenna defined as the reference antenna and the reference antenna forms part of each of the joint subsets) also capture the correlation that exists between elements of the antenna array. This is because, even though the PMIs for the various joint subsets in these embodiments are computed independently of one another, nevertheless each of the joint subsets includes one antenna in common (i.e. the reference antenna is a part of every one of the joint subsets). Because each of the joint subsets for which a PMI is computed and reported back to the eNB includes a common antenna (the reference antenna), correlation between the respective antenna subsets is consequently thought to be captured in the PMIs.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

This application is based upon and claims the benefit of priority from Australian provisional patent application No. 2014902277, filed on Jun. 16, 2014, the disclosure of which is incorporated herein in its entirety by reference.

The invention claimed is:

1. A method for computing precoder matrix indicators (PMIs) in a wireless communication system, the wireless communication system including a base station (eNB) which is operable to communicate with one or more user equipments (UEs) and a set of multiple transmit antennas associated with the eNB that are partitioned into multiple transmit antenna subsets with one of the subsets designated as a reference subset, wherein the UEs are operable to compute multiple PMIs for the respective multiple subsets and to report the multiple PMIs to the eNB for the eNB to use in precoding, the method comprising:

computing a PMI for a given subset based on or using the PMI for the reference subset,
wherein a channel H is a frequency response of a radio link between the transmit antennas associated with the eNB and receiver antennas associated with the UEs, partitioning an array of transmit antennas into N transmit antenna subsets causes partitioning of the channel into N subchannels, and $H_n$ is a channel estimate of the $n$-th antenna subset,
wherein the method further involves:
A) Computing a PMI $p_1$, of the reference subset (n=1);
B) Performing the following for each of (non-reference) antenna subsets n=2, . . . ,N:
   (i) Generating a composite channel matrix $G_n$;
   (ii) Generating composite precoder candidates $V_p$; and
   (iii) Finding a PMI $p_n$,
wherein A) computing the PMI $p_1$, of the reference subset (n=1) is performed according to the following equation, $$p_1 = \underset{p \in \{1,\ldots,N_p\}}{\mathrm{argmax}} \{tr([H_1 V_p]^H [H_1 V_p])\}$$

wherein (i) generating the composite channel matrix $G_n$ is performed according to the following equation, $$G_n = [H_1 H_n]$$

wherein (ii) generating composite precoder candidates $V_p$ is performed according to the following equation, and $$V_p = \begin{bmatrix} W_{p_1} \\ W_p \end{bmatrix},$$

$p = 1, \ldots, N_p$ and $W_p$ is a codeword of a PMI codebook wherein (iii) finding the PMI $p_n$ is performed according to the following equation, $$p_n = \underset{p \in \{1,\ldots,N_p\}}{\mathrm{argmax}} \{tr([G_n V_p]^H [G_n V_p])\},$$

H denotes conjugate transpose.

2. The method as claimed in claim 1, wherein the wireless communication system is a multiple-input multiple-output (MIMO) system wherein the multiple transmit antennas associated with the eNB are operable to transmit signals which are received by multiple receiver antennas with a UE.

3. The method as claimed in claim 1, wherein the wireless communication system is a multi-user MIMO (MU-MIMO) system wherein the multiple transmit antennas associated with the eNB are operable to transmit signals to a plurality of UEs, each of which has multiple receiver antennas, at once.

4. The method as claimed in claim 1, wherein the UE(s) are operable to report the multiple PMIs to the eNB in an uplink.

5. The method as claimed in claim 4, wherein the computing by a UE of a PMI for a given subset based on or using the PMI for the reference subset involves computing said given PMI, which is to be reported to the eNB in a given uplink transmission, based on or using the PMI for the reference subset which is also to be reported to the eNB in the same uplink transmission.

6. The method as claimed in claim 4, wherein the PMIs reported by a UE to the eNB form part of channel state information (CSI) reported to the eNB by the UE in the uplink.

7. The method as claimed in claim 6, wherein the CSI includes the PMIs, a rank indicator (RI) and channel quality indicator (CQI).

8. The method as claimed in claim 1, wherein the set of multiple transmit antennas associated with the eNB comprises a two-dimensional (2D) array of transmit antennas.

9. The method as claimed in claim 8, wherein partitioning the array of transmit antennas involves grouping individual antennas together to form multiple groups of antennas such that each group forms a transmit antenna subset and no subset has any antennas in common.

10. The method as claimed in claim 9, wherein the partitioning is predefined for different transmit antenna array configurations.

11. The method as claimed in claim 8, wherein there is more than one possible partition arrangement (pattern) for a given antenna array configuration, and which of the possible partition arrangements (patterns) is used is configured by the eNB.

12. The method as claimed in claim 1, wherein the subchannels are of size $N_{RX} \times \mu_{TX}$, where $N_{Rx}$ is the number of receiver antennas associated with the UE(s), $N_{Tx}$ is the number of transmit antennas associated with the eNB, and $N\mu_{TX} = N_{Tx}$.

13. A wireless communication system comprising:
a base station (eNB) which is operable to communicate with one or more user equipments (UEs) and a set of multiple transmit antennas associated with the eNB that are partitioned into multiple transmit antenna subsets with one of the subsets designated as a reference subset,
wherein the UEs are operable to compute multiple PMIs for the respective multiple subsets and to report the multiple PMIs to the eNB for the eNB to use in precoding,
wherein a PMI for a given subset is computed based on the PMI for the reference subset,
wherein a channel H is a frequency response of a radio link between the transmit antennas associated with the eNB and receiver antennas associated with the UEs, partitioning an array of transmit antennas into N transmit antenna subsets causes partitioning of the channel into N subchannels, and $H_n$ is a channel estimate of the $n$-th antenna subset,
wherein the UEs are configured to:
A) Compute a PMI $p_1$, of the reference subset (n=1);
B) Perform the following for each of (non-reference) antenna subsets n=2, . . . ,N:
   (i) Generate a composite channel matrix $G_n$;
   (ii) Generate composite precoder candidates $V_p$; and
   (iii) Find a PMI $p_n$,
wherein A) computing the PMI $p_1$, of the reference subset (n=1) is performed according to the following equation, $$p_1 = \underset{p \in \{1,\ldots,N_p\}}{\mathrm{argmax}} \{tr([H_1 V_p]^H [H_1 V_p])\}$$

wherein (i) generating the composite channel matrix $G_n$ is performed according to the following equation, $G_n = [H_1 H_n]$ wherein (ii) generating composite precoder candidates $V_p$; is performed according to the following equation, and $$V_p = \begin{bmatrix} W_{p_1} \\ W_p \end{bmatrix},$$

p =1, . . . ,Np and $W_p$ is a codeword of a PMI codebook
wherein (iii) finding the PMI $P_n$ is performed according to the following equation, $$p_n = \underset{p \in \{1,\ldots,N_p\}}{\mathrm{argmax}} \{tr([G_n V_p]^H [G_n V_p])\},$$

H denotes conjugate transpose.

* * * * *